Nov. 14, 1967  H. MONDON  3,352,199
METHOD AND APPARATUS FOR PRODUCING A DIFFERENTIALLY
CORRECTED ORTHOGONAL PICTURE PLAN OF
THREE-DIMENSIONAL OBJECTS
Filed Aug. 4, 1964  6 Sheets-Sheet 6

INVENTOR:
Herbert Mondon,
BY Singer, Stern &
Carlberg, Attorneys.

United States Patent Office 3,352,199
Patented Nov. 14, 1967

3,352,199
METHOD AND APPARATUS FOR PRODUCING A DIFFERENTIALLY CORRECTED ORTHOGONAL PICTURE PLAN OF THREE-DIMENSIONAL OBJECTS
Herbert Mondon, Wurttemberg, Germany, assignor to Carl Zeiss-Stiftung, Wurttemberg, Germany, a corporation of Germany
Filed Aug. 4, 1964, Ser. No. 387,406
Claims priority, application Germany, Aug. 8, 1963, Z 10,284
4 Claims. (Cl. 88—24)

The invention relates to topography and in particular to an apparatus for producing a differentially corrected orthogonal picture plan from three-dimensional objects.

It is known that central perspective pictures taken by a camera which is positioned perpendicularly above an uneven object show scale distortions which are caused by the relief of the object. Such pictures are, however, usable for producing an orthogonal picture plan of uniform scale if these pictures during their projection are differentially corrected in known manner by so called orthoprojectors.

The principle underlying this invention may briefly be explained with reference to FIG. 1.

The diagrammatic illustration of this figure shows a picture 6 whose picture points 1', 2', 3', 4' and 5' were centrally perspectively obtained from the object points 1, 2, 3, 4 and 5 and are projected by the indicated projector 7 (projection center O) into the projection plane 8 to the points 1", 2", 3", 4" and 5" in accordance with a strictly orthogonal projection only then, when for example with a stationary projector the projection plane 8 is brought for each individual point into an elevation which corresponds to the respective object point; for instance, when the picture point 2' is to be projected, the projection plane 8 has to be adjusted to the position 9, or when projecting the picture point 4', the projection plane 8 has to be adjusted to the position 10.

In order to obtain an orthogonal projective reproduction, the central perspective photograph 6 has to be reproduced under the continuous adaption of the projection distance 11 to the altitude profile of the object, i.e. the distance of the projection center O from the position of the projection plane 8, and this corresponds to a change of the picture scale; the picture 6, then, has to be projected onto a light sensitive layer arranged in the projection plane 8.

This process is known as differential correction of a central perspective picture and the respective apparatus is called an orthoprojector.

It is the object of the invention to provide means for improving the accuracy and efficiency in the production of a differentially corrected orthogonal picture plan of three-dimensional objects by projecting central perspective pictures of an object and stripwise exposing photographic layers while simultaneously continuously altering the picture scale in accordance with the altitude profile of the object, in that the picture plan is photographically exposed in at least $2n-1$ strips, when $n$ is the number of strips for which the respective altitude profiles for the purpose of controlling the picture scale were measured directly, and in that the altitude values of the remaining, interposed strips are automatically determined from the adjacent altitude profiles which were measured.

This invention has the advantage that with the same number of measured profiles the width of the strip to be photographically exposed can be reduced so that there will be considerably less gaps in the edges of the strip.

Furthermore, the invention improves in the picture plan the absolute position accuracy for all details which are located on approximately constant level areas of the object, and increases the accuracy of distances between individual points on different exposure strips.

For carrying out the invention, there is provided an interpolation storage which by means of an interpolation device automatically determines from the measured profiles a preselectable number of intermediary profiles.

The interpolation storage according to the invention entails the further advantage that the work of the photogrammetic apparatus for scanning the profiles can be reduced to a minimum. Furthermore, the profile scanning and the photographic exposure of the picture plan can take place independently from one another at different times. In particular, the photographic exposure of the picture plan is substantially faster than the measuring speed of the photogrammetric evaluation apparatus would permit at simultaneous profile scanning.

The interpolation storage according to the invention may consist, for example, of an information carrier on which the measured altitude profiles are recorded, two scanning devices which scan pairwise the altitude values of the recorded altitude profiles on points associated with each altitude profile, an interpolation ruler pivotally connected with the scanning arrangement, and an interpolation scanning head which is intermittently movable along the interpolation ruler and which transfers the altitude values obtained from the interpolation ruler to the means for adjusting the projection distance in the orthoprojector.

With these and other objects in view, which will become apparent from the following description, the invention will now be described in detail with reference to the accompanying drawings, in which.

Figure 1:
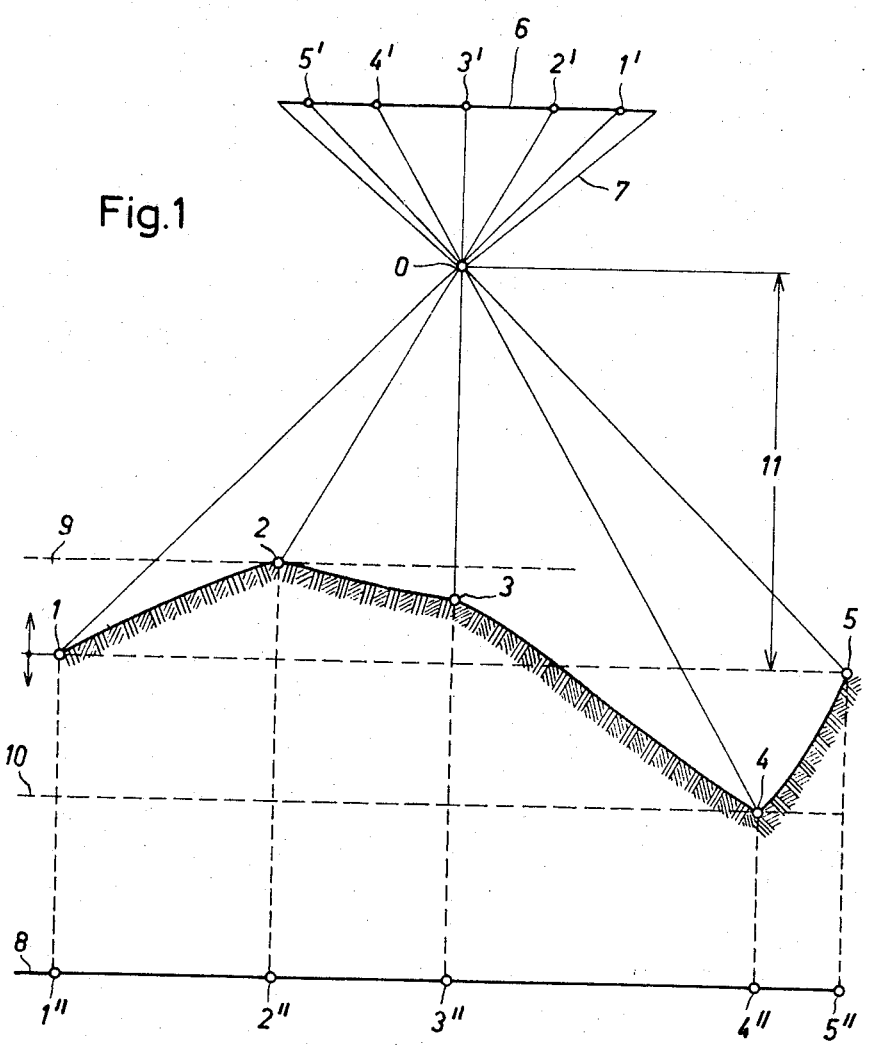
FIG. 1 illustrates diagrammatically the principle of producing an orthogonal picture plan.
Figure 2:
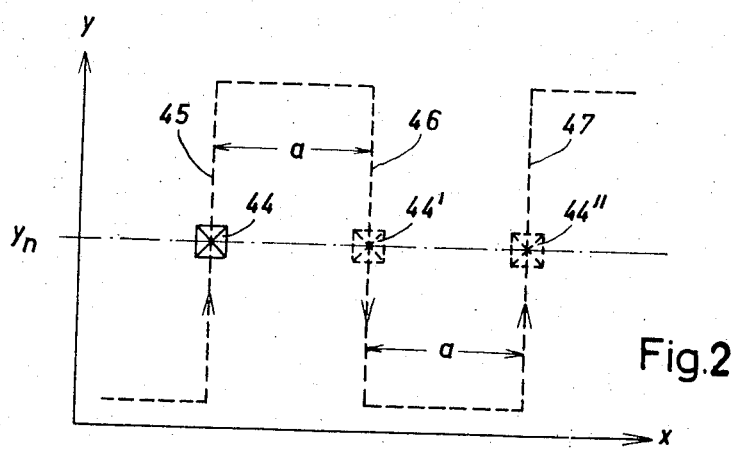
FIGS. 2 and 3 illustrate diagrammatically the relation between the course of the measuring mark for profile scanning in a stereophotogrammetric evaluation device and the course of the exposure diagram in an orthoprojector according to the prior art.
Figure 3:
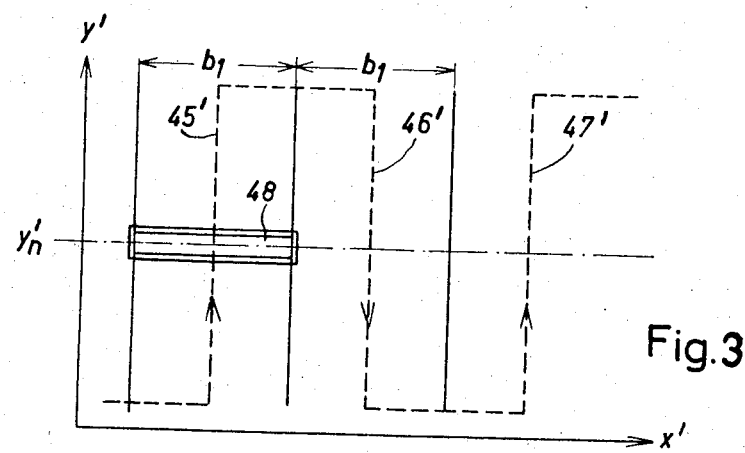
Figure 4:
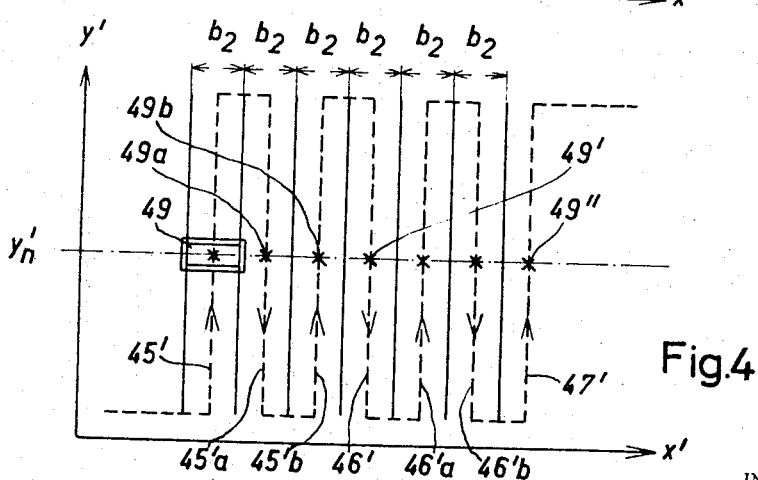
FIG. 4 illustrates diagrammatically the relation between the course of the measuring mark for profile scanning in a stereophotogrammetric evaluation device and the course of the exposure diaphragm in an orthoprojector according to the present invention.

Referring to the FIGS. 2, 3 and 4, the same illustrate diagrammatically the relation between the course of the measuring mark for a profile scanning in a stereophotogrammetric evaluation apparatus and the course of the exposure diaphragm in the orthoprojector according to a prior art method and to the method of the present invention, respectively.

FIG. 2 for example shows the meandering course of the profile measuring mark 44 of the photogrammetric evaluation apparatus in a reference plane $xy$ of the terrain model.

Profiles are recorded along the profile tracks 45, 46, 47 which run at an even distance $a$ from each other parallel to the $y$-direction (an edge of the picture) in that the evaluation apparatus permits the measuring mark 44 according to the altitude (in the third coordinate direction perpendicular to the $xy$-plane) to rest upon the terrain model. 44' and 44" designate points on the profile tracks which have the same $y$-coordinate $(y_n)$ but whose $x$-coordinate is offset by the amount $a$.

In the known method according to FIG. 3 the stripwise photographic exposure in the orthoprojector takes place along the lines 45', 46', 47'—which correspond to the tracks 45, 46, 47 of FIG. 2—in the projection plane $x'y'$ by means of a slit diaphragm 48 whose aperture width $b_1$ corresponds to the distance $a$ between the profile tracks 45, 46, 47. In this manner the projection distance or the projection plane $x'y'$ of the orthoprojector is controlled by the profile measured in the photogrammetric evaluation device; for instance, if the photographic diaphragm 48 is moved along the line 45', the projection distance of the projection plane $x'y'$ is controlled by the profile recorded along the profile track 45; if the diaphragm 48 is moved along the line 46', the projection distance of the projection plane $x'y'$ is determined by the profile recorded on the track 46, etc. Therefore, in the known method the alteration of the projection distance during the photographic exposure of every exposure strip is controlled by a measured altitude profile.

In the method of the invention illustrated in FIG. 4 the photographic exposure of the picture plan placed in the projection plane $x'y'$ is carried out by a diaphragm 49 having a smaller aperture $b_2$ and the diaphragm is guided along narrower tracks than in the known devices, so that the photographic exposure of an object segment of equal size (FIGS. 3 and 4 have the same scale) includes a greater number of strips than in the known method. The position of the exposure tracks 45', 46' and 47' is the same as in FIG. 3. The control of the projection distance during the photographic exposure along these tracks is exercised, as in the known method, by the altitude profiles measured over the associated profile tracks 45, 46, 47 (FIG. 2). The control of the projection distance during the photographic exposure along the intermediate lines $a$ and $b$, respectively, takes place, however, by altitude profiles.

The projection distance in the orthoprojector is, for example, controlled—when the diaphragm 49 is positioned on the line 45' (FIG. 4)—by the altitude value which was measured above the profile track 45 in the position of the measuring mark 44 as shown in FIG. 2. When the center of the diaphragm 49 has reached the spot 49' (FIG. 4), the projection distance is controlled by the altitude value which was measured by means of the measuring mark 44 in the position 44' (FIG. 2). If, however, the center of the diaphragm 49 is located in the intermediate positions 49$a$ or 49$b$, respectively, the control of the projection distance in the orthoprojector takes place by altitude values which are interpolated from the abovementioned altitude values.

In FIG. 4 merely two intermediate strips 45'$a$, $b$ and 46'$a$, $b$, respectively, are indicated, but with a suitable diaphragm aperture width and a correspondingly narrow course of the exposure diaphragm also a larger number of intermediate strips could be interposed.

Figure 5:
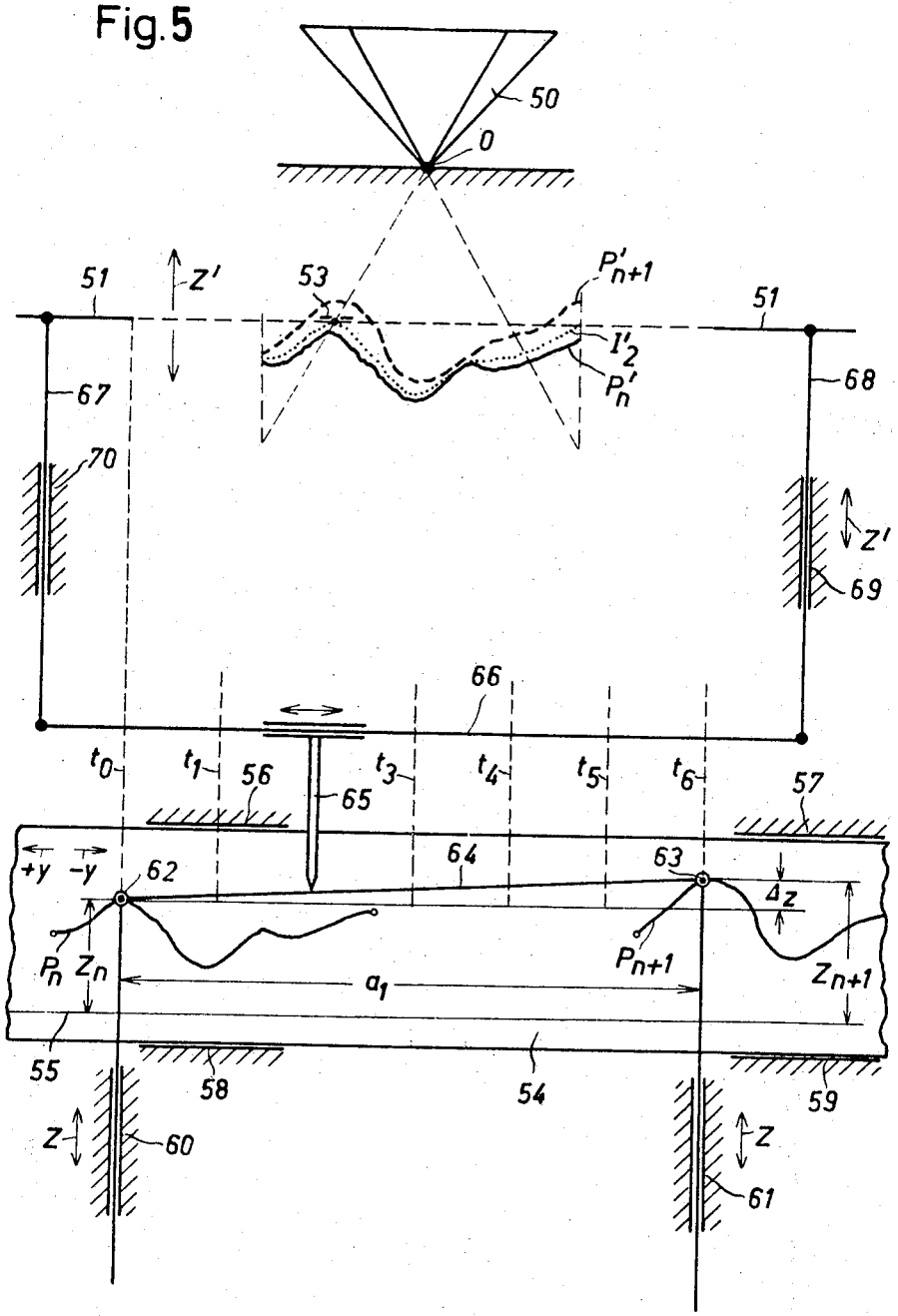
FIG. 5 illustrates diagrammatically an apparatus suitable for practicing the method of the present invention.

The principal design of an arrangement for carrying out the method according to the invention is diagrammatically illustrated in FIG. 5.

In this arrangement the system of an orthoprojector known per se and which is indicated by the projector 50 (projection center O), the adjustable projection plane 51 the second dimension of which is arranged perpendicularly to the plane of the drawing, and by the stripwise guided exposure diaphragm 53, is connected with an interpolation storage according to the invention, whose information carrier 54 has recorded thereon the measured altitude profiles $P_n$, $P_{(n+1)}$, etc. The altitude profiles $P_n$ and $P_{(n+1)}$ have been measured above adjacent profile tracks, as for instance over the tracks 45 and 46 in FIG. 2. The distances $z_n$ and $z_{n+1}$ respectively of the individual points of the curve from the reference line 55 correspond to the measured altitude values. The information carrier 54 is guided in guideways 56, 57, 58, 59 fixedly connected with the interpolation storage. The carrier 54 is slidably adjustable in the directions $+y$ and $-y$. Two scanning devices 62, 63 spaced at a fixed distance $a_1$ from one another and guided by the stationary guideways 60, 61 are slidably adjustable in the direction of the altitude values $z$ and scan the profile characteristics recorded on the information carrier at points coordinated with one another (same $y$-coordinate in the profile measurement, see also FIG. 2 for the intersections of the profile tracks 45, 46 with the straight line $y_n$). The two scanning devices 62, 63 therefore scan simultaneously the profile altitude $z_n$ and $z_{n+1}$ and impart an inclination to the interpolation ruler 64 which is connected with said scanning devices 62, 63. The inclination $$v = \frac{z_{n+1} - z_n}{a_1} = \frac{\Delta z}{a_1}$$

A scanning pin 65 which is in engagement with the interpolation ruler 64 and which may be moved by a program control device of conventional type in a periodic succession by way of example into the positions $t_0$, $t_1 \ldots t_6$, transmits the altitude values scanned on the interpolation ruler 64 by means of the transfer system 66, 67, 68, which is guided in vertical stationary guideways 69, 70, to the projection plane 51. When the scanning pin 65 is in the position $t_0$, it controls under displacement of the information carrier 54 in the $+y$ direction the movement of the projection plane 51 in the direction of the double arrow $z'$ according to the measured original profile $P_n$, and in the position $t_6$ this control is directed by the measured original profile $P_{n+1}$. For the intermediate positions of the scanning pin 65 intermediate profiles I are transmitted whose altitude value for every point is computed according to the formula:

$$z_I = z_n + \frac{z_{n+1} - z_n}{k} = z_n + \frac{\Delta z}{k}$$

wherein $k$ stands for that fraction of the distance $a_1$ by which the scanning pin 65 has been moved out of its starting position $t_0$; for instance, for the position $t_1$ in the subdivision assumed in FIG. 5 the solution is $z_{I_1} = z_n + \frac{1}{6}\Delta z$, and for the position $t_2$: $z_{I_2} = z_n + \frac{2}{6}\Delta z$, etc.

Since the slit diaphragm 53 which is displaceable in the projection plane 51 is moved synchronously with the information carrier 54, the diaphragm 53 will, when the scaning pin 65 for instance is in the position $t_0$, by and by assume all positions indicated by the characteristic P'$_n$. Furthermore, the diaphragm 53 follows the characteristic I'$_2$ when the scanning pin 65 is in the position $t_2$, and follows the characteristic P'$_{n+1}$ when the pin 65 is in the position $t_6$. The characteristics P'$_n$ and P'$_{n+1}$ represent the measured original profiles $P_n$ and $P_{n+1}$, respectively, while the characteristics I'$_2$ corresponds to the intermediate profile interpolated in the position $t_2$ of the scanning pin 65.

Figure 6:
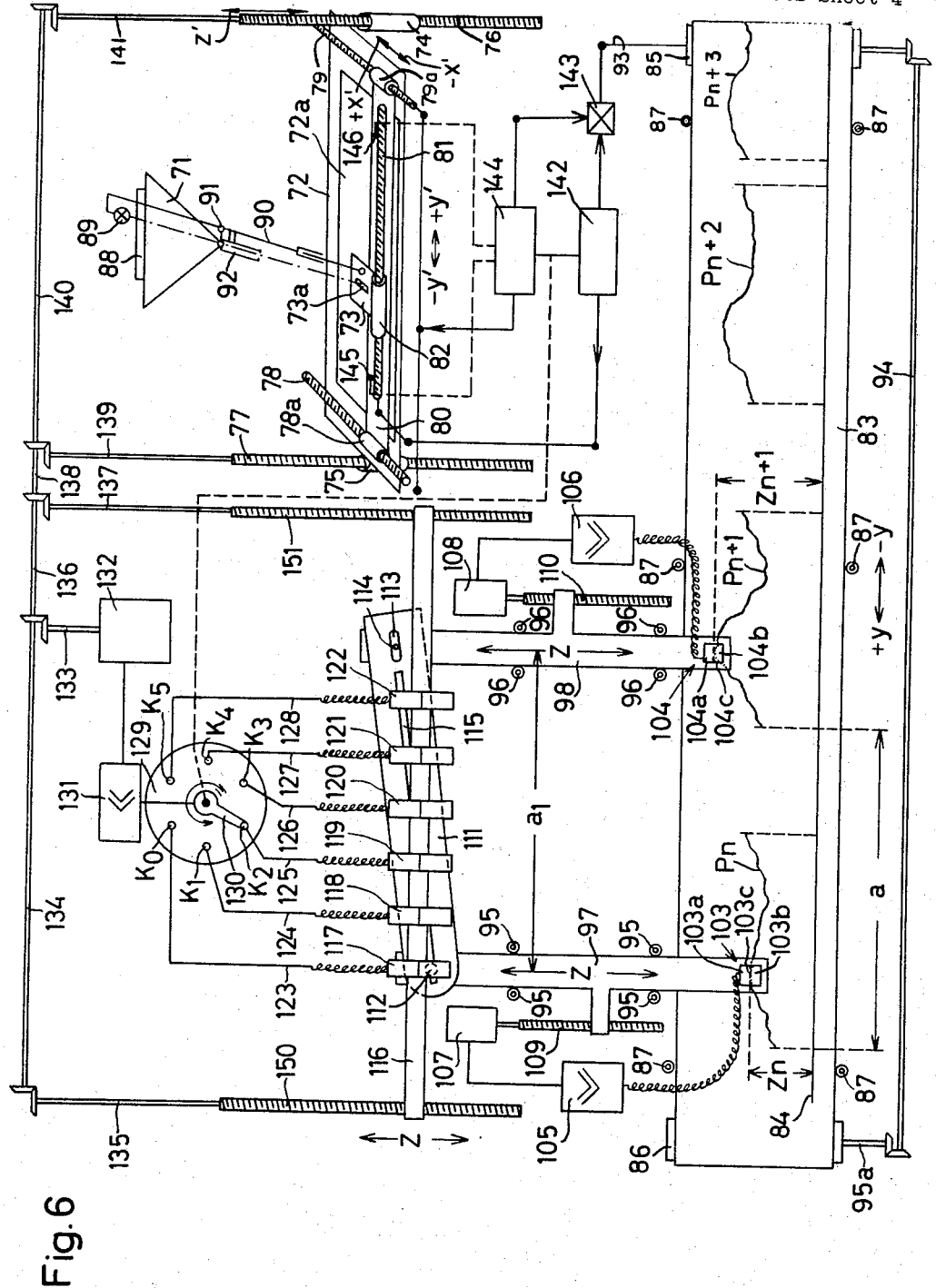
FIG. 6 illustrates diagrammatically another embodiment of the apparatus of the present invention.

In the embodiment of the invention illustrated in FIG. 6 the photograph to be corrected is designated with 88 and the projector which is to project this photograph 88 is designated with 71. The illuminating system 89 of the projector 71 is controlled in known manner by a rod 90 which is connected with the diaphragm carriage 73 and is rotatable between its ends about the pivot point 91. A diaphragm system 92 which is also controlled by the rod 90 assures that merely the immediate environment of the diaphragm aperture 73$a$ is illuminated by the projector 71.

The horizontally disposed projection table 72 is vertically adjustable in the directions of the double arrow $z'$ with respect to the stationary projector 71. This adjustment is performed by means of threaded sleeves 74, 75 attached at right angles to the projection table 72, and rotatable threaded spindles 76, 77 mounted in the frame of the device passing through the sleeves 74, 75. On the projection table 72 are arranged two horizontal adjustment spindles 78, 79 which extend through threaded sleeves 78a, 79a on a carrier 80 carrying the diaphragm carriage 73. These sleeves 78a, 79a effect a horizontal adjustment of the carrier 80 in the directions of the double arrow $x'$. The carrier 80 is provided with a further horizontal threaded adjustment spindle 81 which extends through an interiorly threaded sleeve 82 of the diaphragm carriage 73 and displaces the latter in the horizontal directions $+y'$ and $-y'$, respectively, which are at right angles to the direction $x'$. Further details of the orthoprojector, which is known per se, have been omitted from the drawing for the sake of clearness.

The information carrier 83 pertaining to the interpolation storage according to the invention consists of a light transmitting material coated with an opaque layer. This carrier has scratched in its opaque layer the measured altitude profiles $P_n$, $P_{n+1}$, $P_{n+2}$, and so forth, the altitude values $z_n$ and $z_{n+1}$ of which in turn are derived from the distance of the profile curves from a reference line 84. The information carrier 83 is wound on two spaced rollers 85, 86 and can be moved by means of guide bearings 87 and the gear drive 93, 94, 95a in the horizontal directions $+y$ and $-y$. Two carriages 97, 98 which are spaced at a fixed distance $a_1$ from one another and extend through stationary pairs of guide bearings 95 and 96, respectively, are adjustable in the directions of the altitude values $z$ and are provided at their ends, which protrude beyond the information carrier 83, with photoelectric scanning devices 103 and 104, respectively, which are illustrated in detail in FIG. 7 and which serve for scanning the traced profiles.

Figure 7:
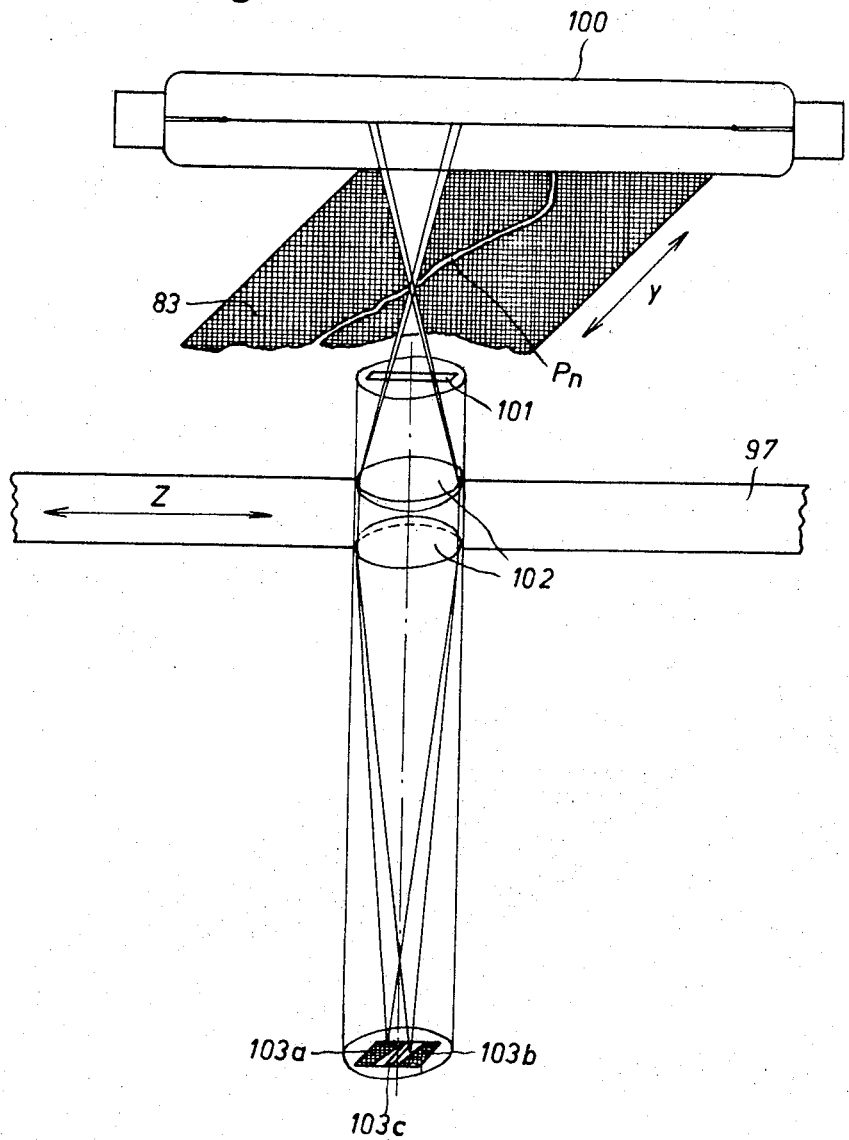
FIG. 7 illustrates diagrammatically the illumination system for the information carrier employed in the apparatus illustrated in FIG. 6.

As shown in FIG. 7, the information carrier 83 is illuminated from one side by tubular source of light 100 which extends in the $z$ direction, Since the opaque layer on the information carrier 83 has been removed only in places where the profile curves, e.g. $P_n$, are scratched in, the profiles appear from the reverse side of the information carrier as narrow luminous lines. A very short section of these lines which is determined by the width of the slit 101, is then projected greatly enlarged by means of the lens system 102 onto the split photoelectric element 103a, 103b.

The photoelectric elements of the scanning device 104, which is operatively connected with the carriage 98, are designated in FIG. 6 with 104a and 104b. The two portions of the photoelectric elements 103a, 103b, and 104a, 104b, respectively, in known manner are poled in opposition and supply a differential voltage other than 0 for such a period of time until the illustrated profile sections are positioned exactly symmetrically to the dividing line 103c resp. 104c of the photoelectric elements 103a, resp. 104a. The differential voltage generated by the photoelectric elements is amplified by the amplifiers 105 and 106, respectively, and operates the motors 107 and 108, respectively, which in turn rotate the adjustment spindles 109 and 110, respectively, of the carriages 97 and 98 which are displaceable in the $z$-direction.

As already mentioned in the description of FIG. 5, also here associated points (like $y$-coordinates on the profile tracks) of the measured profile are scanned. An interpolation ruler 111 on one hand is journaled on a pivot point 112 which is fixed to the carrier 87, and on the other hand is provided with a guide groove 113 through which extends a coupling member 114 mounted on the carriage 98. The interpolation ruler 111 is further provided with a slit 115 through which passes light coming from the source of light (not shown) which is arranged below the ruler in the direction of the slit. Above the interpolation ruler 111 is arranged an interpolation scanning member 116 which carries a number of scanning devices built, for instance, as shown in FIG. 7, and of which FIG. 6 illustrates only the divided photoelectric elements 117, 118, 119, 120, 121 and 122. These scanning devices are uniformly spaced from each other at such a distance that the divided photoelectric element 117 encompasses that section of the light slit 115 which is located above the pivot point 112 of the interpolation ruler 111, while the other scanning devices equally subdivide the distance $a_1$ between the two carriages 97 and 98.

The interpolation scanner 116 extends through rotatably mounted adjustment spindles 150 and 151 and upon rotation of these spindles is adjusted parallel to its own axis in the directions of the double arrows $z$ (FIG. 6).

The two halves of the photoelectric elements 117, 118, 119, 120, 121 and 122 are each connected in opposition to each other and the resultant differential voltage is conducted by the lines 123, 124, 125, 126, 127 and 128 to the contacts $K_0$, $K_1$, $K_2$, $K_3$, $K_4$ and $K_5$ of a step switch 129. The scanning devices connected with the individual contacts of the step switch 129 may be consecutively connected with the amplifier 131 by means of the switch arm 130 rotatably adjustable in the direction of the arrow. The amplifier 131 supplies a follow-up motor (selsyn motor) 132 which on one hand keeps adjusting the interpolation scanner 116 by means of the gear drive members 133, 134, 135, 136, 137 and the adjustment spindles 117, 118 for such a period of time until the photoelectric element connected to the amplifier 131 by the switch arm 130 has intercepted the light ray passing the light slit 115 in the interpolation ruler 111 in similar fashion as do the scanning devices 103 and 104. On the other hand, the motor 132 at the same time adjusts over the gear drive members 138, 139, 140 and 141 and the adjustment spindles 76, 77 the projection table 72 of the orthoprojector in the same manner.

A synchronous drive 142 is connected at one hand with the drive spindle 81 for the diaphragm carriage 73, and on the other hand is connected by a differential gearing 143 with the carriage drive 93, 94 for the information carrier 83.

A stepping mechanism 144, which consists of a conventional program control device, controls by the threaded spindles 77, 78 the advancement of the carrier 80 of the diaphragm carriage, the adjustment of the switch arm 130 in the step switch 129, the reversal of the direction of rotation of the synchronous drive 142, and finally the advancement of the information carrier 83 which is equal to the profile distance $a$. The stepping mechanism 144 receives its advancement impulses from the terminals 145 and 146; i.e. each time the slit diaphragm carriage 73 has moved over a picture strip and has reached the left or right end position, the program roller in the stepping mechanism is advanced by one position.

The operation of the embodiment of the invention as disclosed in FIG. 6 is as follows.

In the starting position for photographically exposing that strip of the picture plan for which the projection distance in the orthoprojector is to be controlled by the measured altitude profile $P_n$, the diaphragm carriage 73 which has been moved over the picture plan stratum $72a$ is located for instance in the end position bordered by the left terminal 145. The information carrier 83 is then displaced so far that the left hand end of the scratched in profile curves $P_n$ and of the following profile $P_{n+1}$ come to lie below the scanning devices 103 and 104, respectively, and are registered by them in the previously described manner. The switch arm 130 touches the contact $K_0$ of the step switch 129. The interpolation scanner 116 is so adjusted by means of the motor 132 that the divided photoelectric element 117 which is connected with the motor 132 intercepts the light coming from the slit 115 in the interpolation ruler 111.

Commencing from this starting position the synchronous drive 142 on one hand drives by means of the threaded spindle 81 the diaphragm 73 along the picture plan strip to be exposed and toward the right hand terminal 146 (+y' direction), and synchronously with this movement it causes by means of the gear train 93, 94, 95a the profile curves $P_n$ and $P_{n+1}$, which are recorded on the information carrier 83 and are positioned below the scanning devices 103, 104, to run off toward the left (+y direction) in such a manner that when the diaphragm carriage 73 has reached the right hand terminal 146, the right hand end points of the profile curves $P_n$ and $P_{n+1}$ are being registered.

During this operation the scanning device 103, which by means of the photoelectric elements 103a, 103b, the amplifier 105, the follow-up motor 107 and the threaded spindle 109 has retained the profile curve $P_n$, transfers the altitude values $z_n$ scanned at a time via the carriage 97 to the pivot point 112 of the interpolation ruler 111.

In the same manner are transferred the altitude values $z_{n+1}$ of the scanned points of the following profile $P_{n+1}$ by the divided photoelectric cells 104a, b, the amplifier 106, the follow-up motor 108, the threaded spindle 110, the carriage 98 and the coupling member 114, to the other end of the interpolation ruler 111 whose light slit 115 thereby receives an inclination which corresponds to the altitude value difference $\Delta z$ of the points scanned at a time on the profile curves $P_n$ and $P_{n+1}$.

During this procedure the switch arm 130 of the step switch 129 remains on the contact $K_0$ which is connected with the divided photoelectric element, so that only the photoelectric element 117 of the interpolation member 116 is able to act upon the follow-up motor 132. The follow-up motor 132 then adjusts by means of the gear train 133, 134, 135, 136, and 137 and the threaded spindles 150 and 151 the interpolation scanner 116 in the direction of the double arrow z in such a manner that the photoelectric element 117 captures or retains that portion of the light slit 115 of the interpolation ruler 111 which is positioned above the pivot point 112. This follow-up movement is transferred simultaneously over the gear train 138, 139, 140 and 141 and the threaded spindles 76, 77 to the projection table 72, so that the latter changes its distance from the stationary projector 71 according to the altitude value of the measured and scanned profile $P_n$.

When the diaphragm carriage 72 reaches the right hand terminal 146, the latter imparts an advancement impulse to the stepping mechanism 144. By means of the threaded spindles 78, 79 the stepping mechanism 144 displaces the diaphragm carriage carrier 80, for instance in the +x' direction, a distance equal to the width of the diaphragm aperture 73a (dimension of this diaphragm aperture in the −x' and +x' directions) so that the diaphragm in the starting position is able to expose the adjacent strip in the picture plan. At the same time the stepping mechanism 144 reverses the direction of rotation of the synchronous drive 142 and moves the switch arm 130 to the contact $K_1$ of the step switch 129.

The synchronous drive 142 now moves the diaphragm carriage 73 in the reverse direction towards the left hand terminal 145 (−y' direction) and at the same time the information carrier 83 towards the right (−y direction) so that the profile curves $P_n$ and $P_{n+1}$ traced on the information carrier are also scanned by the scanning devices 103 and 104 in a direction opposite to the former one.

Since the divided photoelectric element 118 of the interpolation scanner 116 is connected to the follow-up motor 132, the interpolation scanner 116 is now so controlled that the divided photoelectric element 118 captures and keeps the light slit 115 of the interpolation ruler 111.

Owing to the selected number of photoelectric elements of the interpolation scanner 116 and their mutual distance from each other (here for example six photoelectric cells with a mutual distance of $\frac{1}{6}a_1$), the follow-up motor 132 transfers to the projection table 72 altitude values which differ from the altitude values scanned on the profile curves $P_n$ by $\frac{1}{6}$ of the difference between the altitude values scanned on the profile curves $P_{n+1}$ and $P_n$.

When the diaphragm carriage 73 again has reached the left hand terminal 145, the stepping mechanism 144 receives from the terminal an advancement impulse. The stepping mechanism 144 then again displaces the diaphragm carriage carrier 80 by one diaphragm aperture width into the +x' direction, again reverses the rotational direction of the synchronous drive, and finally advances the switch arm 130 to the contact $K_2$ of the step switch 129.

The operation of the diaphragm carriage 73 and of the information carrier 83 will then be the same as described before. However, since now the divided photoelectric element 119 of the interpolation scanner 116 controls the follow-up motor 132 until this photoelectric element has caught the light slit 115 of the interpolation ruler 111, the motor 132 will transfer to the projection table 72 altitude values which differ from the altitude values scanned on the profile curves $P_n$ by $\frac{2}{6}$ of the difference between the altitude values scanned on the profile curves $P_{n+1}$ and $P_n$.

This process is repeated every time the diaphragm carriage has moved over a picture strip and has reached the right hand or left hand terminal, whereby the switch arm 130 is advanced counterclockwise to the following contact of the step switch 129, and to the projection table 72 are transferred intermediate profiles which differ from the preceding ones by one sixth of the difference of the altitude values between the measured altitude profiles $P_n$ and $P_{n+1}$.

When finally the picture plan strip has been photographically exposed which for the purpose of controlling the projecting table 72 has employed the intermediary altitude values scanned by the divided photoelectric element 122 of the interpolation member 116 on the light slit 115 of the interpolation ruler 111, the stepping mechanism 144 by means of the differential gearing 143 and the gear train 93, 94, 95a, advances the information carrier 83 additionally by one profile distance a. As a result the following profile $P_{n+1}$ moves into the position of the profile $P_n$ and the following profile $P_{n+2}$ moves into the position of the profile $P_{n+1}$.

This described operation is repeated in the same manner with all of the remaining altitude profiles recorded on the information carrier during the further photographic exposure of the picture plan.

Figure 8:
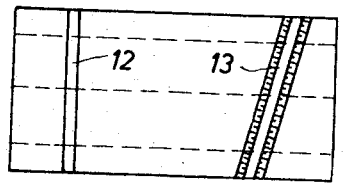
FIG. 8 illustrates an exact plan view of a terrain section in strict orthogonal projection and shows a motor vehicle road 12 leading straight over a hill and a uniformly ascending dam 13.
Figure 9:
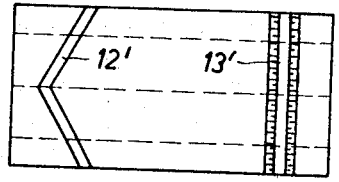
FIG. 9 illustrates the areal plan view of the parts shown in FIG. 8.
Figure 10:
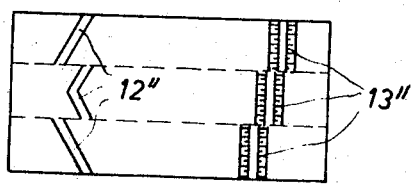
FIG. 10 illustrates the differential correction obtained by a method of the prior art.
Figure 11:
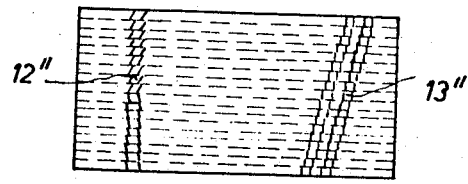
FIG. 11 illustrates the differential correction obtained according to the method of the present invention which employs by way of example a sixfold interpolation.

FIG. 8 is an exact illustration of the plan view which represents the aerial photograph in the shape according to FIG. 9. FIG. 10 illustrates the result of a differential correction according to the prior art methods, and FIG. 11 represents the same situation after a correction according to the present invention with, for instance, a sixfold interpolation.

The method according to the invention is obviously not limited to a sixfold interpolation. Furthermore, in the embodiment of the invention illustrated in FIG. 6, the preselection of a modified programming in the stepping mechanism 144 will accomplish an advancement of the switch arm 130 of the step switch 129 to only every other contact of said step switch, for example, so that the diaphragm carriage carrier 80 will be moved correspondingly great distances and the diaphragm aperture 73a will be adjusted to the proper magnitude.

The invention is not limited to the embodiments of the inventive interpolation storage as illustrated in the FIGS. 5 and 6. Obviously, in the practicing the method of the invention individual structural elements of the interpolation storage of the invention may be replaced by equivalent structure. For example, the scanning of the interpolation ruler may also be performed by mechanical, photoelectrical or electromechanical means.

What I claim is:

1. An apparatus for producing a differentially corrected orthogonal picture plan from three-dimensional objects, comprising means for producing a central perspective projection of said object and a strip-wise exposure of a photographic layer during a continuous change of the projection distance corresponding to the altitude profile of said object, means for exposing said picture plan in at least $2n-1$ strips, wherein $n$ designates the number of strips for which the corresponding altitude profiles have been measured directly for controlling of the projection scale, and means for determining automatically from the adjacent measured altitude profiles the altitude values for determining said projection scale for the other strips arranged between said first mentioned strips.

2. An apparatus for producing a differentially corrected orthogonal picture plan from three-dimensional objects, including an orthoprojector and an interpolation storage connected therewith, said interpolation storage comprising an information carrier having recorded thereon the measured altitude profiles, two scanning devices for scanning the altitude values of said altitude profiles recorded upon said information carrier, said scanning being effected pairwise on points associated with each other, an interpolation ruler pivotally connected with said two scanning devices, an interpolation scanner, and means for periodically adjusting said interpolation scanner along said interpolation ruler, said interpolation scanner transferring the altitude value indicated by the latter on said interpolation ruler to means which adjust the projection distance in said orthoprojector.

3. An apparatus for producing a differentially corrected orthogonal picture plan from three-dimensional objects, including an orthoprojector provided with means for adjusting the projection distance and an interpolation storage connected therewith, said interpolation storage comprising an information carrier having recorded thereon the measured altitude profiles, two laterally spaced and parallel to each other movable scanning devices for scanning the altitude values of said altitude profiles recorded upon said information carrier, said scanning being effected pairwise on points associated with each other, an interpolation ruler pivotally connected with its ends to said two scanning devices, an interpolation scanner, and means for periodically adjusting said interpolation scanner along said interpolation ruler, said interpolation scanner transferring the altitude value indicated by the latter on said interpolation ruler to said means which adjust the projection distance in said orthoprojector.

4. An apparatus for producing a differentially corrected orthogonal picture plan from three-dimensional objects, including an orthoprojector provided with means for adjusting the projection distance and an interpolation storage connected therewith, said interpolation storage comprising an information carrier having scratched therein the measured altitude profiles, two laterally spaced and parallel to each other movable scanning devices including photoelectric elements for scanning the altitude values of said altitude profiles recorded upon said information carrier, said scanning being effected pairwise on points associated with each other, an interpolation ruler pivotally connected with its ends to said two scanning devices, an interpolation scanner provided with a photoelectric element, and means for periodically adjusting said interpolation scanner along said interpolation ruler, said interpolation scanner transferring the altitude value indicated by the latter on said interpolation ruler to said means which adjust the projection distance in said orthoprojector.

References Cited
UNITED STATES PATENTS

| 3,224,328 | 12/1965 | Leistner | 88—24 |
| 3,326,080 | 6/1967 | Schoeler et al. | 88—24 |

NORTON ANSHER, *Primary Examiner.*

RICHARD A. WINTERCORN, *Assistant Examiner.*